(12) United States Patent
Beesley et al.

(10) Patent No.: US 9,856,093 B2
(45) Date of Patent: Jan. 2, 2018

(54) APPARATUS FOR DIVERTING A STREAM OF ARTICLES

(71) Applicant: ILLINOIS TOOL WORKS INC., Glenview, IL (US)

(72) Inventors: Robert C. Beesley, Greenville, SC (US); J. Mark Nunn, Simpsonville, SC (US); Doug A. Imes, Greer, SC (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 15/291,637

(22) Filed: Oct. 12, 2016

(65) Prior Publication Data

US 2017/0107063 A1 Apr. 20, 2017

Related U.S. Application Data

(60) Provisional application No. 62/242,035, filed on Oct. 15, 2015.

(51) Int. Cl.
*B65G 47/51* (2006.01)
*B65G 47/68* (2006.01)

(52) U.S. Cl.
CPC ....... *B65G 47/5131* (2013.01); *B65G 47/682* (2013.01)

(58) Field of Classification Search
CPC ............ B65G 47/5113; B65G 47/5118; B65G 47/5131; B65G 47/682; B65G 47/684; B65G 47/766
USPC ... 198/594, 364, 456, 457.01, 353, 597, 614
See application file for complete search history.

(56) References Cited

U.S. PATENT DOCUMENTS

| | | | |
|---|---|---|---|
| 2,315,880 A | 4/1943 | Stiles | |
| 3,628,647 A * | 12/1971 | Beard | B65G 21/2054 198/454 |
| 6,152,291 A * | 11/2000 | Steeber | B65G 47/5131 198/594 |
| 6,182,812 B1 * | 2/2001 | Hartness, III | B65G 47/5131 198/364 |

(Continued)

FOREIGN PATENT DOCUMENTS

| | | |
|---|---|---|
| DE | 10 2011 015670 A1 | 10/2012 |
| FR | 2 887 533 A1 | 12/2006 |

(Continued)

OTHER PUBLICATIONS

PCT International Search Report, Form PCT/ISA/210, dated Jan. 30, 2017, (5 pages).

(Continued)

*Primary Examiner* — Gerald McClain
*Assistant Examiner* — Keith R Campbell
(74) *Attorney, Agent, or Firm* — Pauley Erickson & Kottis

(57) ABSTRACT

An apparatus for diverting a stream of articles that includes an input conveyor belt conveying a stream of articles in a direction of travel and at an input speed and an output conveyor belt operating at an output speed and disposed parallel with the input conveyor belt in the same direction of travel. A diverter element extending along the input conveyor belt and is moveable between the direction of travel and an opposite direction wherein the diverter element operates in one of two modes of operation depending upon the input speed and the output speed.

19 Claims, 4 Drawing Sheets

(56) References Cited

U.S. PATENT DOCUMENTS

| | | | | |
|---|---|---|---|---|
| 6,497,321 B2 * | 12/2002 | Horton | ............... | B65G 47/5131 |
| | | | | 198/594 |
| 6,585,104 B2 | 7/2003 | Horton et al. | | |
| 6,612,420 B1 * | 9/2003 | Hartness, III | ...... | B65G 47/5131 |
| | | | | 198/594 |
| 6,698,581 B2 * | 3/2004 | Steeber | ............. | B65G 47/5131 |
| | | | | 198/370.01 |
| 6,845,861 B2 * | 1/2005 | Spatafora | ............ | B65G 47/244 |
| | | | | 198/377.08 |
| 7,021,452 B2 | 4/2006 | Horton et al. | | |
| 7,028,830 B2 * | 4/2006 | Beesley | ............ | B65G 47/5131 |
| | | | | 198/594 |
| 7,032,742 B2 * | 4/2006 | Hartness | ............ | B65G 47/5131 |
| | | | | 198/347.3 |
| 7,222,723 B2 | 5/2007 | Horton et al. | | |
| 7,413,072 B2 | 8/2008 | Horton et al. | | |
| 8,573,380 B2 * | 11/2013 | Petrovic | ............ | B65G 47/5131 |
| | | | | 198/347.1 |

FOREIGN PATENT DOCUMENTS

| | | |
|---|---|---|
| WO | WO 01/09015 A1 | 2/2001 |
| WO | WO 02/32797 A1 | 4/2002 |

OTHER PUBLICATIONS

PCT Written Opinion of the International Searching Authority, Form PCT/ISA/237, dated Jan. 30, 2017, (6 pages).

* cited by examiner

APPARATUS FOR DIVERTING A STREAM OF ARTICLES

CROSS-REFERENCE TO RELATED APPLICATIONS

This application claims priority to U.S. Provisional Application Ser. No. 62/242,035, filed on 15 Oct. 2015. This U.S. Provisional Application is hereby incorporated by reference herein in its entirety and are made a part hereof, including but not limited to those portions which specifically appear hereinafter.

BACKGROUND OF THE INVENTION

Field of the Invention

This invention relates generally to conveying systems having power-driven conveying sections and, more particularly, to apparatus for varying the effective length of the system by controlling the diversion of conveyed articles from one conveyor section to another.

Description of Prior Art

Many conveyor applications require that articles transported on one conveyor belt be transferred to another conveyor belt. Stationary rails spanning the conveying surfaces of the belts at a transfer point are often used for this purpose, particularly when the belts travel in opposite directions. In some applications, such as article accumulation, the transfer point can be moved. The moving transfer point allows the effective length of the conveying path and, consequently, the amount of articles accumulated to be controlled. In a spiral accumulator, such as that shown in U.S. Pat. No. 6,152,291, two parallel conveyor belts—an infeed belt and outfeed belt—are helically arranged with a rotatable transfer mechanism traveling between them. The position of the transfer mechanism depends on the relative speeds of the two oppositely-moving belts. A guide plate on the transfer mechanism directs articles from the infeed conveyor belt to the outfeed belt. A rotatable member in the transfer mechanism simultaneously engages drivers formed on the specially designed infeed and outfeed belts. The rotatable member, driven by the drivers, translates the transfer mechanism and its attached guide plate along the belts as determined by their relative speeds. The rotatable member rides along with the transfer mechanism.

A more common accumulation system is known as a bi-di (bi-directional) table. Typically, a bi-di table includes a bi-directional conveyor belt arranged to run perpendicular to a main conveyor belt. As articles build up on the main conveyor belt, backpressure directs them onto the bi-di belt, which runs in a direction away from the main conveyor. In this way, articles are accumulated on the bi-di belt's surface. As downstream processes require more articles, the direction of the bi-di belt is reversed so that the accumulated articles are pushed back onto the main conveyor belt. These bi-di tables, which support the bi-di belt and its drive mechanisms, are generally rectangular in shape with drive or idler shafts for sprockets or pulleys at each end. But, unlike the spiral accumulator, these simple, ubiquitous tables are not first-in, first out.

U.S. Pat. No. 6,497,321 and U.S. Pat. No. 7,222,723, both incorporated herein by reference, and related patents are directed to a first in, first-out accumulation system having a mechanism for diverting articles from one conveyor belt to another, in particular, oppositely-moving conveyor belts. In such systems, oppositely moving conveyor belts are traversed by a diverter that spans portions of both belts and is driven at a differential speed corresponding to the difference in speed between the oppositely moving conveyor belts. This machine works well for a wide range of applications, but the nature of the diverting mechanism requires that products being accumulated must flow into and out of the machine from the same end.

Therefore, there exists a need for a first in, first-out accumulation system having a mechanism for diverting articles from one conveyor belt to another when the belts are traveling in the same direction.

SUMMARY OF THE INVENTION

The present invention is directed to first in, first-out accumulation system having a mechanism for diverting articles from one conveyor belt to another conveyor belt traveling in the same direction. The apparatus according to the invention includes an input conveyor belt and an output conveyor belt positioned in parallel and generally co-planar. The input conveyor belt is preferably wider than the output conveyor belt. A diverter element preferably extends at least partially across the input conveyor belt and is moveable between the direction of travel and an opposite direction.

In such an arrangement, the diverter element preferably operates in a first mode at a differential rate in the direction of travel or the opposite direction when the output speed is faster than the input speed. The diverter element preferably also operates in a second mode fixed in the direction of travel at the input speed when the output speed is slower than the input speed. The described arrangement enables a first in, first out accumulation of the articles that accounts for the differences between the input speed and the output speed of the respective belts.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
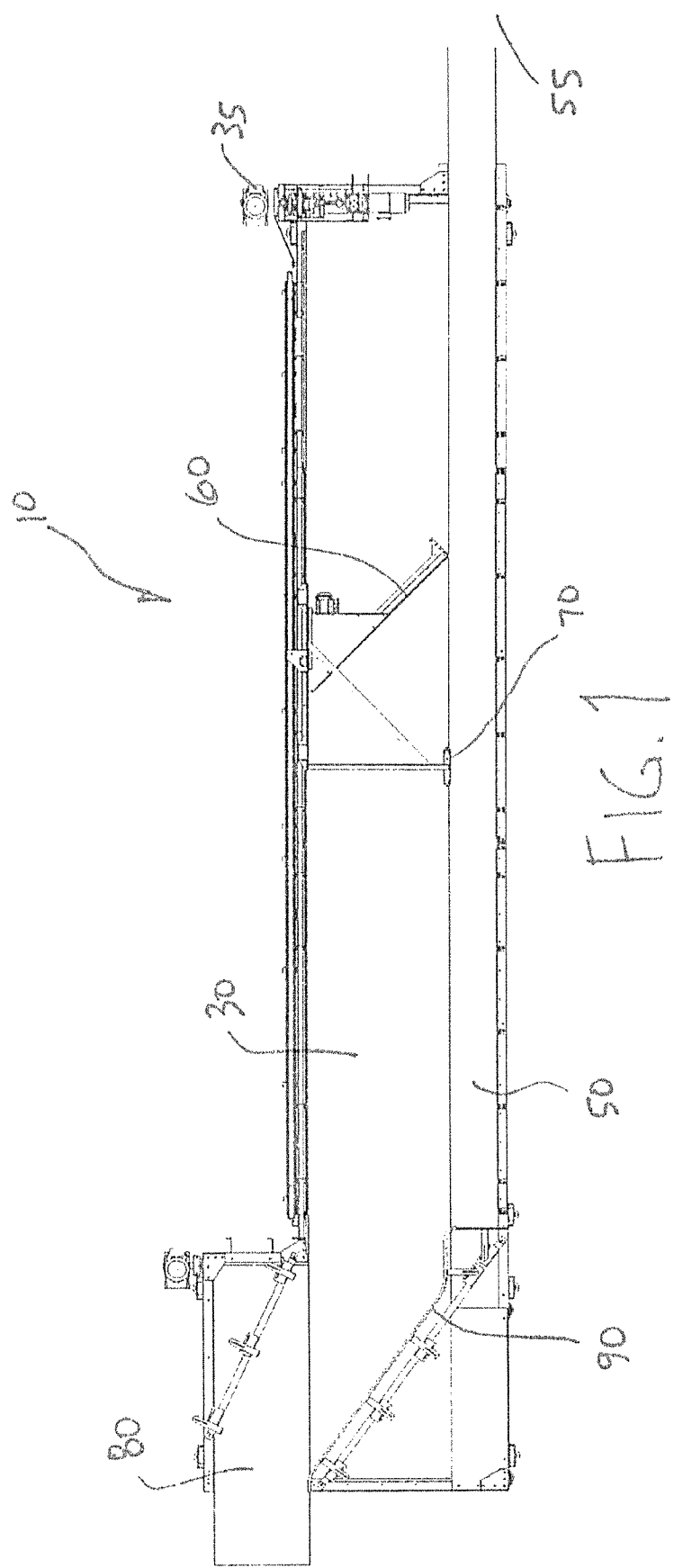
FIG. 1 is a top view of the apparatus according to one preferred embodiment of the invention.
Figure 2:
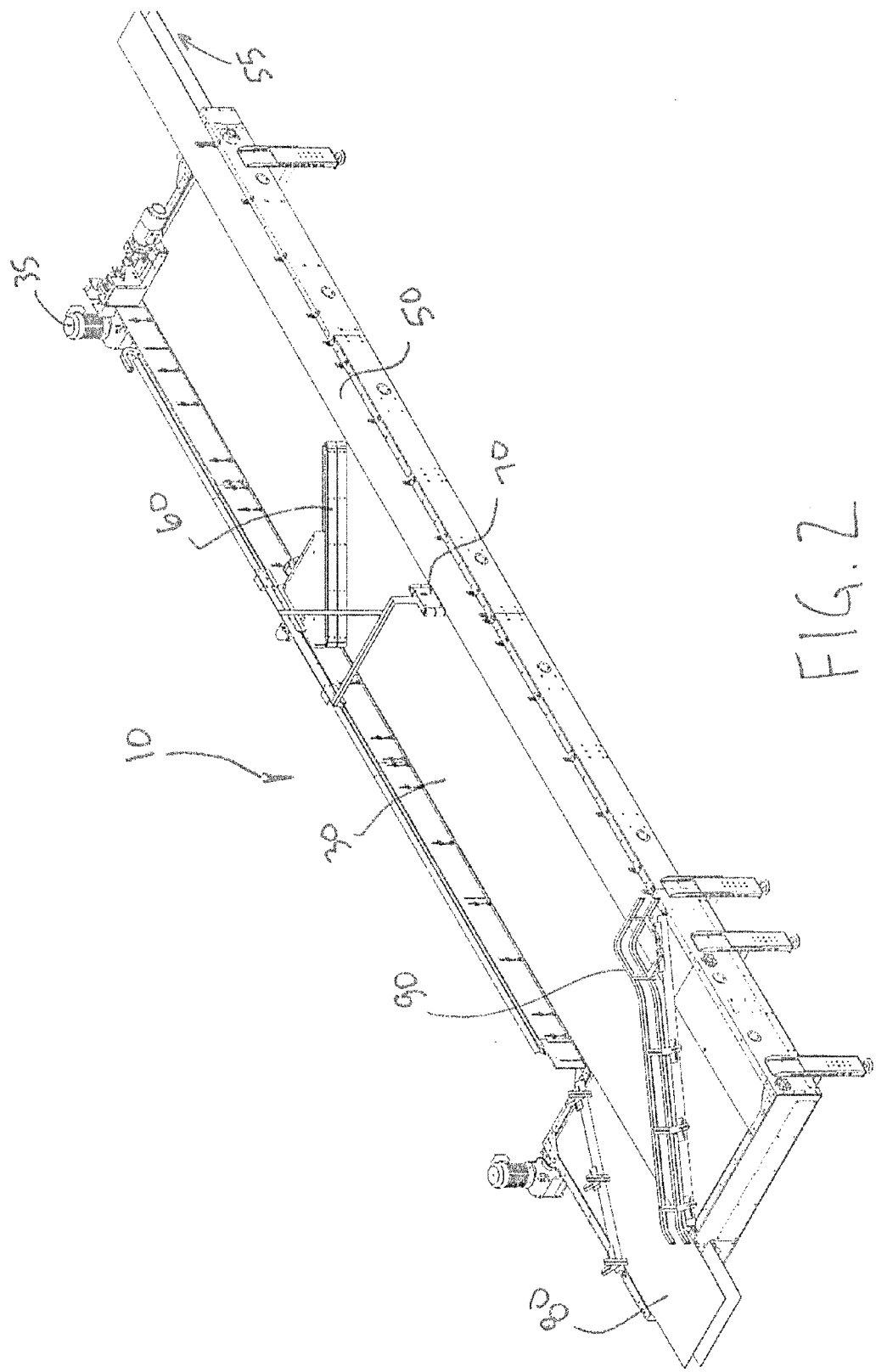
FIG. 2 is a top perspective view of the apparatus shown in FIG. 1.

FIGS. 1 and 2 show an apparatus according to one preferred embodiment of the invention. The apparatus as shown is preferably a first in, first-out accumulation system having a mechanism for diverting, and potentially accumulating, a stream of articles from one conveyor belt to another conveyor belt traveling in the same direction. As such, the apparatus 10 includes (1) an input conveyor belt 30 conveying a stream of articles 20 in a direction of travel and at an input speed and (2) an output conveyor belt 50 disposed parallel to the input conveyor belt 30 conveying the stream of articles 20 in the same direction of travel and at an output speed. Although not a required component of the subject invention, FIGS. 1 and 2 additionally show a feed conveyor 80 that provides a stream of articles 20 to the input conveyor belt 30. The feed conveyor 80 may be an endless conveyor belt as shown, a robotic picker, or any other feeding and/or conveying system known to those having ordinary skill in the art.

The input conveyor belt 30 and the output conveyor belt 50 are preferably positioned in parallel and preferably directly abut each other for a substantial length of the input conveyor belt 30. In addition, the input conveyor belt 30 and the output conveyor belt 50 are preferably generally co-planar and preferably include similar surfaces so as to predictably convey and transfer the plurality of articles 20.

As shown, the input conveyor belt 30 is preferably wider than the output conveyor belt 50. In one preferred embodiment, the input conveyor belt 30 is approximately three times wider than the output conveyor belt 50.

As further shown in FIGS. 1 and 2, a diverter element 60 is preferably positioned along the input conveyor belt 30. The diverter element 60 preferably extends at least partially, and preferably entirely, across the input conveyor belt 30. In one preferred embodiment, the diverter element 60 extends only across the input conveyor belt 30 and does not impinge on the space above the output conveyor belt 50. The diverter element 60 is preferably mechanically connected with respect to the input conveyor belt 30 so as to be moveable between the direction of travel and an opposite or reverse direction.

In such an arrangement as described above and described in more detail below, the diverter element 60 preferably operates in a first mode at a differential rate in the direction of travel or the opposite direction when the output speed is faster than the input speed and wherein the diverter element 60 operates in a second mode fixed in the direction of travel at the input speed when the output speed is slower than the input speed. The described arrangement enables a first in, first out accumulation of the articles accounting for any differences between the input speed and the output speed of the respective belts 30, 50.

Figure 4:
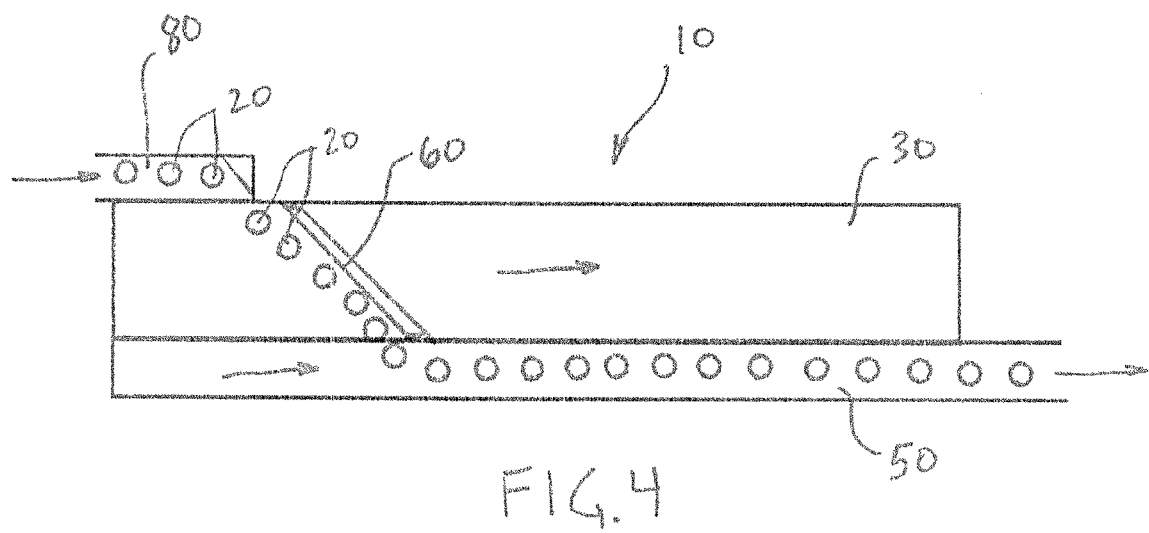
FIG. 4 is a schematic of the apparatus according to one preferred embodiment of the invention.

More particularly, the first mode, shown schematically in FIG. 4 and sometimes referenced as "differential mode," occurs when the output speed of outfeed conveyor belt 50 is faster than the input speed of the input conveyor belt 30. In this first mode, the diverter element 60 may either move in the direction of travel or opposite the direction of travel and at a speed determined by the differential rate to control the population of articles 20 and to transfer articles 20 from the infeed conveyor belt 30 to the outfeed conveyor belt 50. Expressed in equation form for $V_s$, where $V_s$=speed of the diverter element 60, $V_s=(W_iV_i-W_oV_o)/(W_i-W_o)$, where $V_i$=input speed, $V_o$=output speed, $W_i$=infeed conveyor belt with and $W_o$=outfeed conveyor belt width. As such, the first mode is operational when $V_oW_o > V_iW_i$ and an article sensor (described below) is clear.

Figure 5:
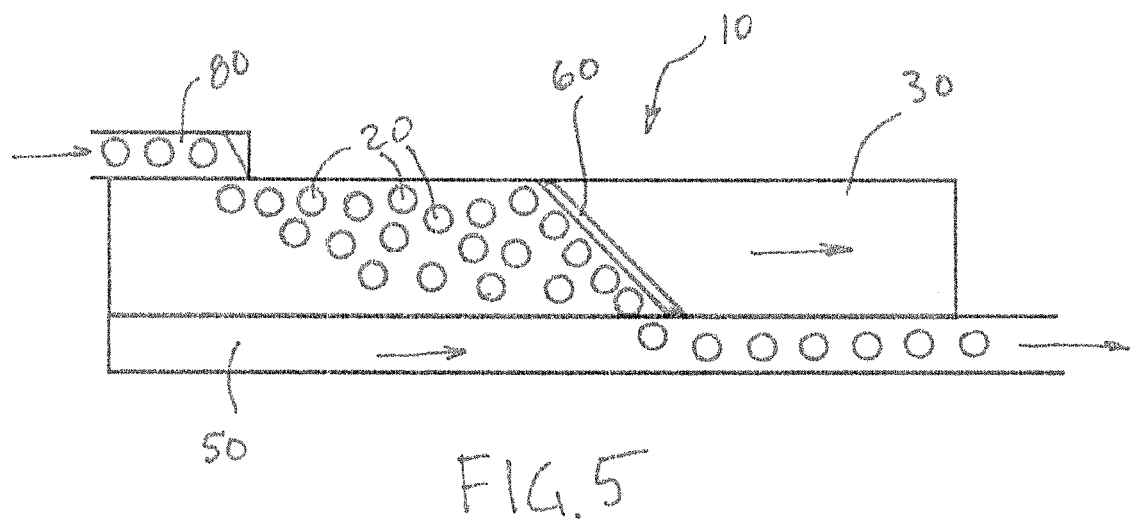
FIG. 5 is a schematic of the apparatus according to one preferred embodiment of the invention.

In the second mode, shown schematically in FIG. 5, when the output speed of the outfeed conveyor belt 50 is stopped, seized, blocked, slowed or otherwise decreased relative to the input speed of the input conveyor belt 30, preferably at a speed one-third or less of the infeed speed, the diverter element 60 is preferably locked to the infeed conveyor belt 30 (i.e, $V_i=V_s$) and the articles 20 do not transfer at all to the output conveyor belt 50. The output conveyor belt 50 is preferably independent of both the infeed conveyor belt 30 and the diverter element 60. The apparatus 10 preferably runs in the second mode until $V_o > V_i$ and the sensor 70 is clear. Expressed in equation form, the second mode applies when $W_oV_o \leq W_iV_i$ or when the sensor 70 is blocked.

According to a preferred embodiment of the invention, an input drive mechanism 35 drives the input conveyor belt 30. An output drive mechanism 55 drives the output conveyor belt 50, and a carrier drive mechanism 65 drives the diverter element 60. The aforementioned drive mechanisms 35, 55, 65 may be independent motors or may be otherwise interconnected to control the respect conveyors 30, 50 and diverter 60. A controller (not shown) is preferably connected with respect to the apparatus 10 for directly controlling the input drive mechanism 35 and the output drive mechanism 55.

In operation, the input conveyor belt 30 and the output conveyor belt 50 may operate at different speeds depending on the supply of articles arriving at the input conveyor belt 30 and the disposition of articles dispatched by the output conveyor belt 50. The delta between the input speed and the output speed preferably results in a speed and direction of the diverter element 60.

The apparatus 10 may further include one or more sensors that detect a presence of articles, the output speed, a speed differential between the input speed and the output speed, a count of the articles, a density of the articles and/or other factors that may determine the operation of the apparatus 10.

In operation, there are several preferred embodiments for achieving two operating modes as described above. Details of the mechanical/electrical systems may vary but each is capable of achieving the first mode and the second mode, and the transfer between modes, as described above. One such method of operation may utilize a direct driven carrier 65 for the diverter element 60. In such an embodiment, a motor may drive the carrier 65 directly. The formulas described above may be programmed into one or more controllers and the carrier 65 may be moved based on infeed and outfeed conditions.

Figure 3:
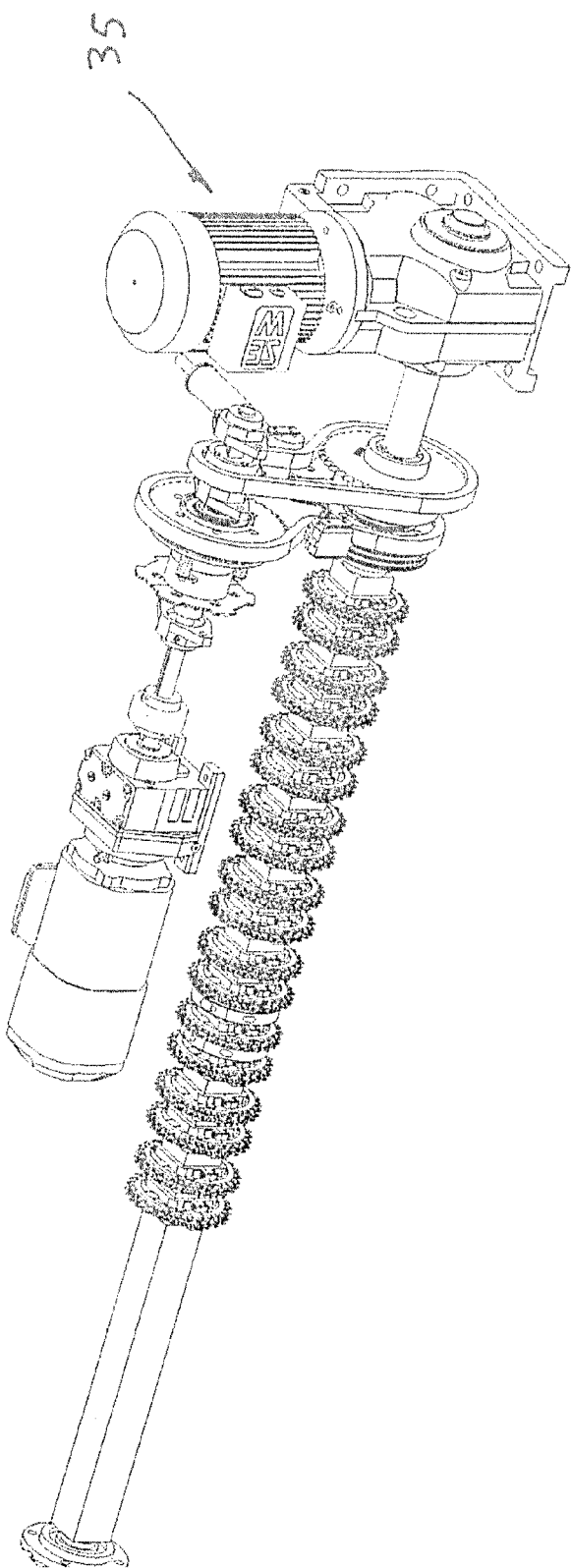
FIG. 3 is a side perspective view of a portion of the apparatus according to one preferred embodiment of the invention.

According to one preferred embodiment of the invention, a mechanical differential may be utilized with a clutch. A purely mechanical system may be used with a clutch to switch between two drive mechanisms to change between the first mode and the second mode. FIG. 3 shows such a system utilizing a clutched approach. Alternatively, a hybrid mechanical/motor control system may be used with direct motor input on either or both of the input conveyor belt 30 and the output conveyor belt 50. This embodiment is described above wherein an input drive mechanism 35 and an output drive mechanism are responsible for the direct drive of each respective conveyor belt 30, 50.

As best shown in FIGS. 1 and 2, an infeed guide 90 is preferably positioned at least partially between the input conveyor belt 30 and the output conveyor belt 50. The infeed guide 90 is preferably positioned toward an input end of the output conveyor belt 50 along the transition between the input conveyor belt 30 and the output conveyor belt 50 and preferably extends at least partially between the two belts.

While in the foregoing specification this invention has been described in relation to certain preferred embodiments thereof, and many details have been set forth for purpose of illustration, it will be apparent to those skilled in the art that the subject invention is susceptible to additional embodiments and that certain of the details described herein can be varied considerably without departing from the basic principles of the invention.

The invention claimed is:

1. An apparatus for diverting a stream of articles comprising:
    an input conveyor belt traveling in a first direction and conveying a stream of articles in a direction of travel and at an input speed;

a diverter element extending along the input conveyor belt and moveable in each of the first direction and a second direction that is opposite the first direction;

an output conveyor belt disposed parallel to the input conveyor belt, traveling in the first direction, and conveying the stream of articles in the direction of travel and at an output speed, wherein the output conveyor belt is narrower than the input conveyor belt; and wherein the diverter element moves in a first mode at a speed determined by a differential rate between the input speed and the output speed in the first direction or the second direction when the output speed is faster than the input speed and wherein the diverter element moves in a second mode fixed in the first direction at the input speed when the output speed is slower than the input speed.

2. The apparatus of claim 1 further comprising an input drive mechanism driving the input conveyor belt, an output drive mechanism driving the output conveyor belt, and a carrier drive mechanism driving the diverter element.

3. The apparatus of claim 2 further comprising a controller for directly controlling the input drive mechanism and the output drive mechanism.

4. The apparatus of claim 1 wherein the diverter element is disposed above only the input conveyor belt.

5. The apparatus of claim 1 wherein each of the input conveyor belt, the output conveyor belt and the diverter element operates at different speeds.

6. The apparatus of claim 1 further comprising a sensor that detects a speed differential between the input speed and the output speed.

7. The apparatus of claim 1 further comprising an infeed guide positioned at least partially between the input conveyor belt and the output conveyor belt.

8. The apparatus of claim 1 wherein the input conveyor belt is approximately three times wider than the output conveyor belt.

9. The apparatus of claim 1 wherein the input conveyor belt and the output conveyor belt are parallel and directly abut each other.

10. The apparatus of claim 1 wherein articles are accumulated along the input conveyor belt in a first in, first out manner.

11. An apparatus for diverting a stream of articles comprising:

an input conveyor belt traveling in a first direction and conveying a stream of articles in a direction of travel and at an input speed;

a diverter element extending along the input conveyor belt and moveable in each of the first direction and a second direction that is opposite the first direction;

an output conveyor belt disposed parallel to the input conveyor belt, traveling in the first direction, and conveying the stream of articles in the direction of travel and at an output speed, wherein the output conveyor belt is narrower than the input conveyor belt; and wherein the diverter element operates in a first mode at a speed of $V_s=(W_iV_i-W_0V_0)/(W_i-W_0)$ and wherein the diverter element operates in a second mode at a speed equal to the input speed, $V_s=V_i$, when the output speed is slower than the input speed.

12. The apparatus of claim 11 further comprising an input drive mechanism driving the input conveyor belt, an output drive mechanism driving the output conveyor belt.

13. The apparatus of claim 12 wherein at least one of the input drive mechanism and the output drive mechanism also drives the diverter element.

14. The apparatus of claim 1 further comprising a sensor that detects one or more articles and is operatively connected with respect to at least one of the input conveyor belt, the output conveyor belt, and the diverter element.

15. The apparatus of claim 12 further comprising an infeed guide positioned at least partially between the input conveyor belt and the output conveyor belt.

16. The apparatus of claim 12 wherein articles are accumulated along the input conveyor belt in a first in, first out manner.

17. An apparatus for diverting a stream of articles comprising:

an input conveyor belt traveling in a first direction and conveying a stream of articles in a direction of travel and at an input speed;

a diverter element extending along the input conveyor belt and moveable in each of the first direction and a second direction that is opposite the first direction;

an output conveyor belt disposed parallel to and co-planar with the input conveyor belt, traveling in the first direction, and conveying the stream of articles in the direction of travel and at an output speed, wherein the output conveyor belt is narrower than the input conveyor belt; and wherein the diverter element moves in one of two modes of operation having different directions or rates of diverter element movement, depending upon a difference between the input speed and the output speed.

18. The apparatus of claim 17 wherein the diverter element is disposed above only the input conveyor belt.

19. The apparatus of claim 18 wherein the diverter element is disposed at an angle relative to a longitudinal direction of the input conveyor belt.

* * * * *